United States Patent
Kato et al.

[11] Patent Number: 6,086,845
[45] Date of Patent: Jul. 11, 2000

[54] SILVER OXIDE FOR USE IN CELLS AND A PROCESS FOR PRODUCING THE SAME

[75] Inventors: Hidekazu Kato, Funabashi; Shigetoshi Uchino, Honjo; Kouki Toishi, Honjo; Kenichi Harigae, Honjo, all of Japan

[73] Assignee: Dowa Mining Co., Ltd., Tokyo, Japan

[21] Appl. No.: 09/413,576

[22] Filed: Oct. 6, 1999

Related U.S. Application Data

[62] Division of application No. 08/964,178, Nov. 4, 1997, Pat. No. 6,030,600.

[30] Foreign Application Priority Data

Nov. 8, 1996 [JP] Japan ................................ 8-312915
Oct. 29, 1997 [JP] Japan ................................ 9-312761

[51] Int. Cl.$^7$ .......................................... C01G 3/02
[52] U.S. Cl. ................................... 423/604; 423/592
[58] Field of Search ........................ 423/592, 604; 502/317, 330, 344

[56] References Cited

U.S. PATENT DOCUMENTS

| | | | |
|---|---|---|---|
| 4,039,317 | 8/1977 | Montino et al. | 75/0.5 A |
| 4,101,719 | 7/1978 | Uetani et al. | 429/206 |
| 4,247,606 | 1/1981 | Uetani et al. | 429/91 |
| 4,330,437 | 5/1982 | Krueger | 252/476 |
| 4,757,512 | 7/1988 | Macken | 372/59 |
| 4,792,505 | 12/1988 | Moyes | 429/219 |
| 4,835,077 | 5/1989 | Megahed et al. | 429/219 |
| 5,188,660 | 2/1993 | Tosun et al. | 75/370 |
| 5,589,109 | 12/1996 | Passaniti et al. | 252/518 |

FOREIGN PATENT DOCUMENTS

| | | |
|---|---|---|
| 48-53219 | 7/1973 | Japan . |
| 48-53221 | 7/1973 | Japan . |
| 48-53222 | 7/1973 | Japan . |
| 57-111956 | 7/1982 | Japan . |
| 58-051477 | 3/1983 | Japan . |
| 58-51469 | 3/1983 | Japan . |
| 58-163151 | 9/1983 | Japan . |
| 58-163167 | 9/1983 | Japan . |
| 58-163168 | 9/1983 | Japan . |

OTHER PUBLICATIONS

Databse WPI, Section CH, Week 9736, Derwent Publications Ltd., London, GB, XP–002082427, An 97–389246, of JP 09 169520, Jun. 30, 1997 *Encyclopedia of Chemical Reactions*, Edited by Clifford A. Hampel, (1956), pp. 179 and 210.

Primary Examiner—Tom Dunn
Assistant Examiner—Cam N. Nguyen
Attorney, Agent, or Firm—Frishauf, Holtz, Goodman, Langer & Chick, P.C.

[57] ABSTRACT

An aqueous sodium carbonate solution is added in an equivalent amount to an aqueous silver nitrate solution (Ag=100 g/L) under stirring and, with nitric acid and sodium hydroxide being added to adjust the pH to 5.5–6.5, a silver carbonate precipitate is formed and subsequently washed thoroughly and dried at 250° C. or below to produce a silver oxide powder, which satisfactory characteristics for use in cells, as exemplified by high water absorption, good shape of granules, high strength, non-stickiness to the molding punch, high fluidity and low residual carbon content. The pellet of the powder has high cell capacity.

8 Claims, 1 Drawing Sheet

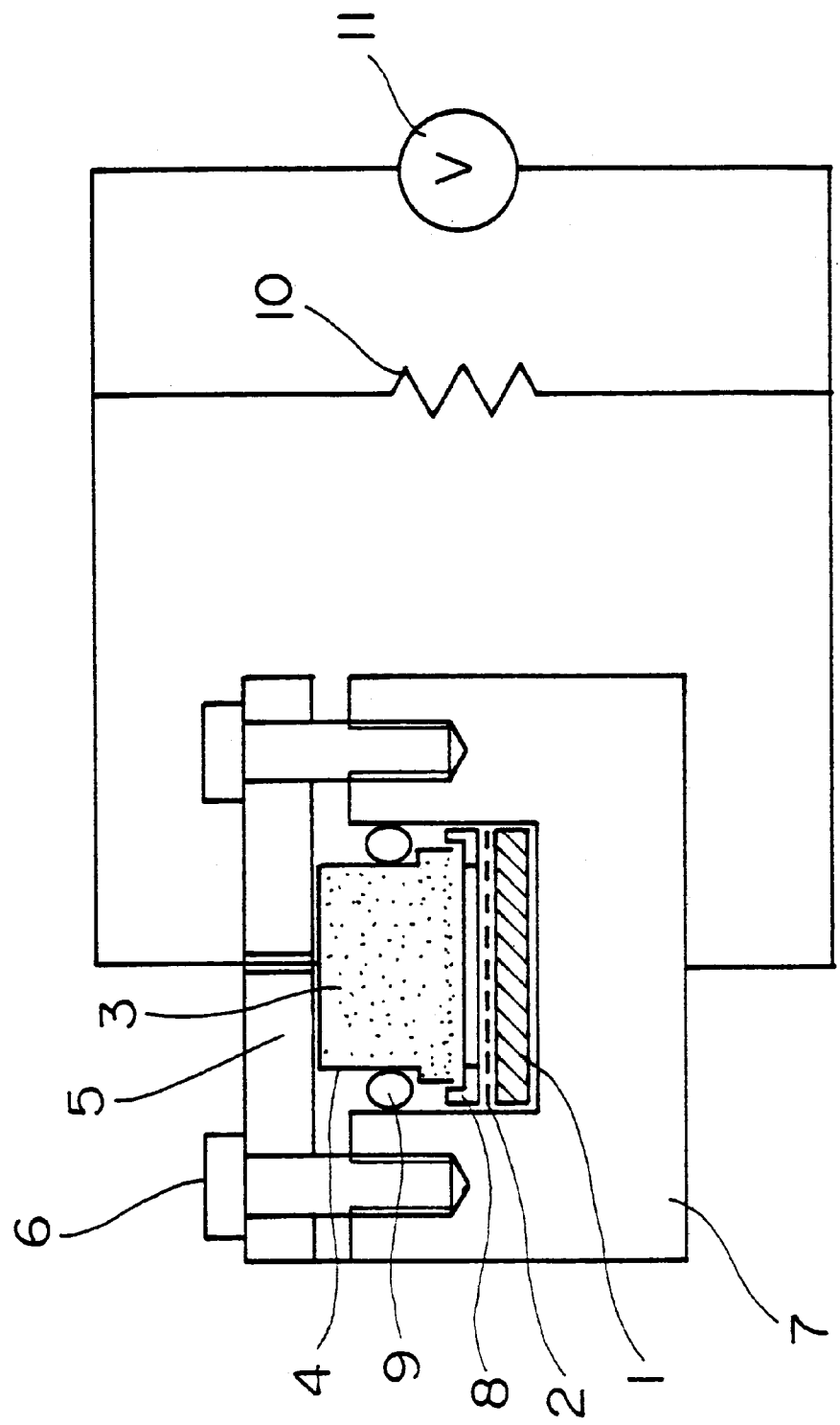

SILVER OXIDE FOR USE IN CELLS AND A PROCESS FOR PRODUCING THE SAME

This is a division of application Ser. No. 08/964,178 filed Nov. 4, 1997, is now U.S. Pat. No. 6,030,600 issued Feb. 29, 2000.

BACKGROUND OF THE INVENTION

This invention relates to silver oxide for use as a positive electrode active material in silver oxide cells, a process for producing the same and a galvanic cell using such silver oxide as a positive electrode active material.

The prior art in this field is found in the following references: Unexamined Published Japanese Patent Application No. 53219/1973, 53221/1973 and 53222/1973 which specify the pore volume of a silver oxide positive electrode active material per unit volume and its cell density; Unexamined Published Japanese Patent Application No. 111956/1982 which teaches the effectiveness of porous silver oxide for discharge characteristics; and Unexamined Published Japanese Patent Application No. 51469/1983 which teaches an improvement in moldability that is achieved by granulation with a binder.

These patents individually describe the desirable characteristics of the silver oxide for use in cells; however, no single silver oxides proposed by these patents satisfy the requirements of all characteristics but they have had the following defects:

(1) in the case of using the porous silver oxide, if an organic binder is employed with a view to improving the discharge characteristics, the pores in the silver oxide particles are plugged by the binder and the characteristics of the porous silver oxide are not fully exhibited;

(2) if the addition of the binder is reduced, the strength of the granules decreases so much that they will break as a result of handling in the molding step and the flowability of the powder will eventually vary to deteriorate its meterability: and (3) the conventional silver oxide powder is not specified in terms of the size of primary particles and contains fines ($\leq 5$ $\mu$m) which do harm to the efficiency of mass production by getting into the clearance of pelletizing dies or sticking to the punches during molding.

SUMMARY OF THE INVENTION

The present invention relates to silver oxide for use in silver oxide cells and its principal object is to provide a silver oxide powder for use in cells that satisfies various performance requirements simultaneously, including water absorption which affects discharge characteristics, the shape of granules, the strength of particles, their fluidity and the non-stickiness to molding dies, all of which affect moldability, as well as the contents of residual carbon, metallic silver and chlorine which affect the deterioration of cells.

The present inventors conducted intensive studies in order to solve the aforementioned problems of the prior art and found silver oxide particles that satisfied all of the performance requirements set forth above. The present invention has been accomplished on the basis of this finding.

According to its first aspect, the invention relates to a silver oxide for use in cells which comprises silver oxide granules and which, when subjected to the measurement of the strength of particles with a ro-tap automatic sifter fitted with a 200-mesh standard sieve, yields -200 mesh particles in an amount of no more than 1 wt % per minute due to particle disintegration.

The invention also relates to a silver oxide for use in cells which comprises silver oxide granules and which has a bulk density of 1.7–3.2 g/cm$^3$.

The invention also relates to a silver oxide for use in cells which comprises silver oxide granules having a bulk density of 1.7–3.2 g/cm$^3$ and which, when subjected to the measurement of the strength of particles with a ro-tap automatic sifter fitted with a 200-mesh standard sieve, yields -200 mesh particles in an amount of no more than 1 wt % per minute due to particle disintegration.

The invention also relates to a silver oxide for use in cells which comprises silver oxide granules which comprise spherical porous particles having crevices on the surface which are 1–30 $\mu$m wide and not longer than 300 $\mu$m.

The invention also relates to a silver oxide for use in cells which comprises silver oxide granules having a bulk density of 1.7–3.2 g/cm$^3$ which comprise spherical porous particles having crevices on the surface which are 1–30 $\mu$m wide and not longer than 300 $\mu$m and which, when subjected to the measurement of the strength of particles with a automatic sifter fitted with a 200-mesh standard sieve, yields -200 mesh particles in an amount of no more than 1 wt % per minute due to particle disintegration.

The invention also relates to a silver oxide for use in cells which comprises silver oxide granules and has a carbon content of no more than 0.1 wt %.

The invention also relates to a silver oxide for use in cells which comprises silver oxide granules and has a chlorine content of no more than 0.005 wt %.

The invention also relates to a silver oxide for use in cells which comprises silver oxide granules having a bulk density of 1.7–3.2 g/cm$^3$, a carbon content of no more than 0.1 wt % and a chlorine content of no more than 0.005 wt % and which, when subjected to the measurement of the strength of particles with a ro-tap automatic sifter fitted with a 200-mesh standard sieve, yields -200 mesh particles in an amount of no more than 1 wt % per minute due to particle disintegration.

The invention also relates to a silver oxide four use in cells which comprises silver oxide granules having a bulk density of 1.7–3.2 g/cm$^3$, a carbon content of no more than 0.1 wt % and a chlorine content of no more than 0.005 wt %, said granules comprising spherical porous particles having crevices on the surface which are 1–30 $\mu$m wide and not longer than 300 $\mu$m, and which, when subjected to the measurement of the strength of particles with a ro-tap automatic sifter fitted with a 200-mesh standard sieve, yields -200 mesh particles in an amount of no more than 1 wt % per minute due to particle disintegration.

The invention also relates to a silver oxide for use in cells which comprises silver oxide granules having 5–20 open pores on the surface per 100 $\mu$m$^2$ of the surface in diameters of 0.1–5 $\mu$m.

The invention also relates to a silver oxide for use in cells which comprises silver oxide granules, which has no more than 0.5 wt % of the residue undissolved in a 5 wt % aqueous potassium cyanide solution and which is substantially free of a silver peak in X-ray diffraction.

The invention also relates to a silver oxide for use in cells which comprises silver oxide granules having a bulk density of 1.7–3.2 g/cm$^3$ and 5–20 open pores on the surface per 100 $\mu$m$^2$ of the surface in diameters of 0.1–5 $\mu$m, which has no more than 0.5 wt % of the residue undissolved in a 5 wt % aqueous potassium cyanide solution, which is substantially free of a silver peak in X-ray diffraction and which, when subjected to the measurement of the strength of particles with a ro-tap automatic sifter fitted with a 200-mesh standard sieve, yields −200 mesh particles in an amount of no more than 1 wt % per minute due to particle disintegration.

The invention also relates to a silver oxide for use in cells which comprises silver oxide granules having a bulk density of 1.7–3.2 g/cm$^3$, a carbon content of no more than 0.1 wt % and a chlorine content of no more than 0.005 wt %, said granules comprising spherical porous particles having crevices on the surface which are 1–30 μm wide and not longer than 300 μm and 5–20 open pores on the surface per 100 μm$^2$ of the surface in diameters of 0.1–5 μm, which has no more than 0.5 wt % of the residue undissolved in a 5 wt % aqueous potassium cyanide solution, which is substantially free of a silver peak in X-ray diffraction and which, when subjected to the measurement of the strength of particles with a ro-tap automatic sifter fitted with a 200-mesh standard sieve, yields −200 mesh particles in an amount of no more than 1 wt % per minute due to particle disintegration.

The invention also relates to a silver oxide for use in cells which comprises silver oxide granules and which produces a spread of at least 8 cm in a fluidity test in which 5 g of a powder sample is allowed to deposit on a flat plate in a bulk density meter (JIS K5101), the flat plate being mechanically vibrated through 10 cycles at a frequency of 60 cycles/min with a stroke of 20 mm to spread the deposit and the longer side of the spread deposit being measured to evaluate the fluidity of the powder.

The invention also relates to a silver oxide for use in cells which comprises silver oxide granules which are composed of particles having a maximum size of no more than 300 μm with the content of fines no greater than 5 μm being no more than 5 wt %.

The invention also relates to a silver oxide for use in cells which comprises silver oxide granules having a bulk density of 1.7–3.2 g/cm$^3$, which produces a spread of at least 8 cm in a fluidity test in which 5 g of a powder sample is allowed to deposit on a flat plate in a bulk density meter (JIS K5101), the flat plate being mechanically vibrated through 10 cycles at a frequency of 60 cycles/min with a stroke of 20 mm to spread the deposit and the longer side of the spread deposit being measured to evaluate the fluidity of the powder, said granules being composed of particles having a maximum size of no more than 300 μm with the content of fines no greater than 5 μm being no more than 5 wt % and which, when subjected to the measurement of the strength of particles with a ro-tap automatic sifter fitted with a 200-mesh standard sieve, yields −200 mesh particles in an amount of no more than 1 wt % per minute due to particle disintegration.

The invention also relates to a silver oxide for use in cells which comprises silver oxide granules having a bulk density of 1.7–3.2 g/cm$^3$ and 5–20 open pores on the surface per 100 μm$^2$ of the surface in diameters of 0.1–5 μm, which has no more than 0.5 wt % of the residue undissolved in a 5 wt % aqueous potassium cyanide solution, which is substantially free of a silver peak in X-ray diffraction, which produces a spread of at least 8 cm in a fluidity test in which 5 g of a powder sample is allowed to deposit on a flat plate in a bulk density meter (JIS K5101), the flat plate being mechanically vibrated through 10 cycles at a frequency of 60 cycles/min with a stroke of 20 mm to spread the deposit and the longer side of the spread deposit being measured to evaluate the fluidity of the powder, said granules being composed of particles having a maximum size of no more than 300 μm with the content of fines no greater than 5 μm being no more than 5 wt % and which, when subjected to the measurement of the strength of particles with a ro-tap automatic sifter fitted with a 200-mesh standard sieve, yields −200 mesh particles in an amount of no more than 1 wt % per minute due to particle disintegration.

The invention also relates to a silver oxide for use in cells which comprises silver oxide granules and which experiences a springback of no more than 1% upon removal from a molding die during pelletizing.

According to its second aspect, the invention relates to a process for producing silver oxide comprising the steps of adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the mixture to between 4 and 9 so as to yield an organic acid salt or a carbonate of silver as an intermediate.

The invention also relates to a process for producing silver oxide comprising the steps of adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the mixture to between 4 and 9 so as to yield an organic acid or a carbonate of silver as an intermediate, characterized in that the dissolution and crystallization which occur in the steps up to the precipitation and growth of the organic acid salt or carbonate and subsequent granulation are repeated to thereby form crevices on the surfaces of granules.

The invention also relates to a process for producing silver oxide comprising the steps of adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the mixture to between 4 and 9 so as to yield an organic acid salt or a carbonate of silver as an intermediate, characterized in that the precipitate is dried at an insufficient temperature to cause substantial reduction of silver, whereby the carbonate or organic acid salt is decomposed to yield silver oxide.

The invention also relates to a process for producing silver oxide comprising the steps of adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the mixture to between 4 and 9 so as to yield an organic acid salt or a carbonate of silver as an intermediate, characterized in that the precipitate is dried at an insufficient temperature to cause substantial reduction of silver, whereby the carbonate or organic acid salt is decomposed to yield silver oxide which is subsequently sieved.

The invention also relates to a galvanic cell characterized by comprising any of the silver oxide of the types mentioned above.

The invention also relates to a galvanic cell characterized by comprising the silver oxide which has been produced by any of the processes referred to hereinabove.

BRIEF DESCRIPTION OF THE DRAWING

FIG. 1 is a schematic diagram of the apparatus used to measure the cell characteristic of the powders prepared in the Example and Comparative Example.

DETAILED DESCRIPTION OF THE INVENTION

The term "granules" as used herein refers to secondary particles which are each composed of a plurality of primary particles. In the Example of the invention which will be described later in this specification, the primary particles had average sizes of, say, 1–20μ, and were flowable; on the other hand, the granules were of such a strength that they would not easily disintegrate upon handling as in transport.

In order to improve the moldability, the formation of 5 μm and finer grains was prevented at the stage of powder synthesis, thereby successfully synthesizing a powder substantially free of grains not larger than 5 μm.

The process for producing the silver oxide powder of the invention comprises the steps of adding at least one of sodium citrate, sodium potassium tartrate, sodium carbonate, sodium hydrogencarbonate, ammonium carbonate, ammonium hydrogencarbonate, potassium carbonate, potassium hydrogencarbonate, carbon dioxide, etc. in an amount of 1–2 equivalents per silver so as to generate an organic acid salt or a carbonate of silver, which are allowed to precipitate, grow and granulate with an acid and alkali being added to adjust the pH to 4–9. If the pH is below 4 or above 9, more of the silver salts will dissolve to increase the silver concentration in solution and the yield of the desired silver oxide deteriorates to reduce the production efficiency. To obtain good yield, it is desired to age the precipitated silver oxide at a pH of 5.5–6.5 before the resulting powder is compacted.

If the pH is held at 4–9 and given an appropriate aging time, the fine particles will once be dissolved and then be reprecipitated to grow with the aid of solubility until the fines no longer exist. Eventually, the appropriate strength and elasticity will develop. Thereafter, the precipitate is washed and dried with heat to produce the desired silver oxide powder. The pH adjustment may be performed with an acid such as nitric acid, hydrochloric acid or sulfuric acid and an alkali such as sodium hydroxide or aqueous ammonia, and the preferred example is the combination of nitric acid and aqueous ammonia.

If insufficient washing and drying are performed, the residual carbon and chlorine contents will cause a shortage of the cell capacity of the positive electrode active material and cell burst may occur. The residual carbon and chlorine contents are desirably no more than 0.1 wt % and 0.005 wt %, respectively.

The drying and decomposition were effected in the temperature range of 100–250° C. and the proportion of metallic silver which would be a cause of the shortage of cell capacity was controlled to be no more than 0.5 wt % as measured in terms of the residue which was undissolved in a 5 wt % aqueous potassium cyanide solution and also controlled to be such that no silver peak would appear in X-ray diffraction. The silver oxide thus obtained was sieved by a vibrating screen fitted with a 30 mesh sieve.

A press forming experiment was conducted using a silver oxide powder comprising grown particles and a sample containing the yet to grow fines; the former sample which was free of 5 μm and finer particles did not stick to the molding die but the latter sample containing the fines sticked extensively to the die. The sticking problem was particularly noticable with a silver oxide powder containing many particles with a size of 1 μm and less and molding could not be continued unless the molding die was cleaned after each molding cycle. When a powder comprising 5 μm or greater particles was mixed with about 10 wt % of the fines, the sticking problem became less noticable and it was hardly noticable in the presence of about 5 wt % of the fines. Therefore, the content of 5 μm and finer particles is desirably 5 wt % and less. Since particles of above 300 μm in size have low fluidity, they cannot be used if a mold is to be uniformly filled with such powder. If used, scatterings both in the densities of compacted powder and in the densities of pellets will increase.

In order to enhance the fluidity during molding, the particles precipitated in the reaction solution were fluidized therein, thereby producing highly flowable granules. Under the influence of their slight solubility in solution, the primary particles will undergo repeated dissolution and precipitation to bind together weakly accompanied by forming crevices, thereby forming granules of an appropriate strength. The strength of granules is difficult to measure and defines straightforward expression. One practical measure is the proportion of –200 mesh particles that form as a result of disintegration on a 200-mesh ro-tap shaker (ro-tap automatic sifter) and it desirably takes a volume of no more than 1 wt % per minute. If –200 mesh particles occur in more than 1 wt %, the powder will disintegrate during transport and the increased amount of 5 μm and finer particles causes unwanted effects such as sticking to the molding die and deteriorated meterability. Various granular samples were prepared that were comprised of the above-described particles ranging from 5 to 300 μm in size.

For quantitative fluidity evaluation, 5 g of a powder sample was allowed to deposit on a flat in a bulk density meter (JIS K5101) and the flat plate was mechanically vibrated through 10 cycles at a frequency of 60 cycles/min with a stroke of 20 mm to spread the deposit and the longer side of the spread deposit was measured. For qualitative fluidity evaluation, the bottom of a transparent resin hopper was equipped with a shutter-fitted precise metering device and after the hopper was charged with various samples of silver oxide powder, its interior was examined. Upon repeated metering, the powder of silver oxide which produced a spread of about 3 cm in the fluidity test described above formed a bridge within the hopper and the bridge could not be broken unless the hopper was shaken; hence, the meterability of the powder was very poor. On the other hand, the silver oxide granules which produced a spread of about 10 cm in the fluidity test did not form any bridge and allowed for smooth metering. It was therefore clear that for assuring good meterability, the spread of powder deposit as measured in the fluidity test conducted by the method described above must be at least 8 cm.

The silver oxide used as the positive electrode active material in silver oxide cells requires that the positive electrode pellet can absorb a large amount of water while exhibiting high density; however, both requirements are difficult to satisfy at the same time because upon press forming, the granules disintegrate and the primary particles pack tightly to achieve a higher density but, on the other hand, the distance between the primary particles decreases and closed pores will occasionally form, resulting in insufficient supply of the electrolyte in an assembled cell. According to the invention, open pores are intentionally formed in the primary particles making up an individual granule and this ensures that the efficiency of electrolyte supply will not deteriorate no matter how much the distance between the primary particles is reduced during molding.

Further, crevices 1–30 μm wide and not longer than 300 μm are allowed to be present on the surfaces of granules so as to make them easily collapsible; in addition, this enhances the adhesion of graphite flakes which are added to impart electrical conductivity to the silver oxide; these features combine to enable the production of high-density pellets under low forming pressure.

In the Example of the invention that follows, a silver oxide is prepared which comprises silver oxide granules having 5–20 open pores on the surface per 100 $\mu m^2$ of the surface the open pores having sizes of 5 μm and below and the average particle size being about 2 μm. If these sizes assume unduly high values or if the degree of granulating is insufficient, the granules become easily disintegrable. One of the measures that can effectively represent the degree of granulating is bulk density. Insufficiently granulated silver oxide particles have low bulk density which is no more than about 1.5 g/cm$^3$; as the granulating progresses with increased compaction, the bulk density becomes 1.5 g/cm$^3$ and higher; considering the strength of granules, the bulk density is desirably 1.7 g/cm$^3$ and more. Below 1.5 g/cm$^3$, the springback increases to exceed 1% and in an extreme case the pellets may break upon demolding. If the bulk density reaches above 3.2 g/cm$^3$, the denisty of granule itself becomes too high to retain crevice-like cracks on the surface and anti-fracture characteristics will decrease.

As a result of the investigation for the factors discussed above, powders satisfying all of the performance requirements of interest could be produced in accordance with the invention.

The following example is provided for the purpose of further illustrating the present invention but is in no way to be taken as limiting.

EXAMPLE 1

(a) An aqueous sodium carbonate solution was added to an aqueous silver nitrate solution (50 g/L of Ag) in an equivalent amount (molar ratio of sodium carbonate to Ag=0.5) under stirring. The pH of the mixture was adjusted to 5.5–6.5 by addition of nitric acid and aqueous ammonia to form a silver carbonate precipitate followed by growing the precipitate into granules. The same procedures inclusive of dissolution and precipitation were repeated until granulated particles having the crevices were obtained. The precipitate was washed, filtered and dried at 100° C.; thereafter, the temperature was slowly elevated to a maximum of 250° C., at which the precipitate was dried, heated and decomposed to yield a silver oxide powder.

(b) Another silver oxide powder sample was prepared by repeating the procedure of (a) except that the concentration of Ag in the aqueous silver nitrate solution was increased to 100 g/L.

(c) Another silver oxide powder sample was prepared by repeating the procedure of (a) except that the concentration of Ag in the aqueous silver nitrate solution was further increased to 200 g/L.

(d) Another silver oxide powder sample was prepared by repeating the procedure of (b) except that the aqueous sodium carbonate solution was added in an amount of two equivalents (molar ratio of sodium carbonate to Ag=1).

(e)–(l) Additional silver oxide powder samples were prepared by repeating the procedure of (b) except that the aqueous sodium carbonate solution was replaced by other reactants. The silver oxide thus obtained was sieved by a vibrating screen fitted with a 30-mesh sieve.

The silver oxide powder samples thus prepared were subjected to X-ray diffraction and substantially no silver peak occurred in any sample. The samples were also evaluated for the following characteristics.

Fluidity Test:

Five grams of a powder sample was allowed to deposit on a flat plate in a bulk density meter (JIS K5101), and the flat plate was mechanically vibrated through 10 cycles at a frequency of 60 cycles/min with a stroke of 20 mm to spread the deposit and the longer side of the spread deposit was measured to evaluate the fluidity of the powder.

Particle Size Distribution:

The number of 5 μm and finer particles present in the powder sample was determined by counting in a scanning electron micrograph and their proportion was expressed in weight percentage after approximation by spheres. It was also determined that no particles of above 300 μm in size existed.

Appearance of Particles:

As a result of observing scanning electron micrographs, it was confirmed that all the particles obtained in the example were granular, spherical and porous particles.

Strength of Particles:

The powder sample was placed on a 200-mesh standard sieve and set on a ro-tap shaker (ro-tap automatic sifter), which was vibrated at a frequency of 290 cycles/min with a stroke of 25 mm under 160 tappings/min so as to measure the time-dependent change in the weight of –200 mesh particles, and the ratio of the –200 mesh particles during measurement to the +200 mesh particles at the initial stage was expressed in weight percentage.

Carbon Content:

The content of carbon dioxide in the powder sample was measured by gas chromatography and expressed in weight percentage.

Chlorine Content:

The content of chlorine in the powder sample was measure by ICP and expressed in weight percentage.

KCN Insoluble Content:

The amount of the silver oxide powder that remained undissolved in a 5 wt % aqueous potassium cyanide solution was measured and its ratio to the initial charge was expressed in weight percentage.

Number of Open Pores on the Particle Surface:

The number of open pores (0.1–5 $\mu m^\Phi$) present on the particle surface was determined per 100 $\mu m^2$ of the surface by counting in a scanning electron micrograph.

Absence or Presence of Crevices:

Under examination of scanning electron micrograph, the surfaces of particles were checked for the presence of crevices which were 1–30 μm wide and not longer than 300 μm.

Springback:

The pellet demolded after high-pressure forming was evaluated for the degree of springback by calculation with the following formula:

$$\text{Springback} = [(\text{diameter of pellet/diameter of die}) - 1] \times 100 \ (\%)$$

Cell Characteristic:

The cell characteristic of each powder sample was expressed in terms of cell capacity (mAh) which was measured by the following cell evaluation test with a testing apparatus having the construction shown in FIG. 1.

Each of the powders prepared in the Example and the Comparative Example to be described below was mixed with 5 wt % carbon and processed to form a silver oxide pellet 1 having a diameter of 11 mm and a thickness of 0.9 mm. A positive electrode was made of the pellet by addition of a KOH solution. A separator 2 made of Cellophane and a nonwoven cotton fabric was placed on the pellet 1. A zinc powder, a small amount of acrylate based gelling agent and a KOH solution were mixed to form a negative electrode compound 3. The compound 3 was packed into a negative electrode cap 4 which was pressed under a retainer plate 5 and secured to a jig 7 by means of bolts 6. The jig 7 was made of Ni-plated stainless steel and the negative electrode cap 4 was made of a three-layer laminate consisting of a nickel outer layer, a stainless steel intermediate layer and a copper inner layer. The clearance between the jig 7 and the negative electrode cap 4 was filled with a gasket 8 and a seal ring 9. The cell thus constructed was discharged through a 15-k$\Omega$ resistor 10 and its capacity was measured with a voltmeter 11. The discharging was terminated at 1.2 volts.

The conditions for preparing the respective powder samples and the results of evaluation of their characteristics are shown in Tables 1 and 2, respectively.

TABLE 2

Characteristic Values of Silver Oxide Powders

|  | Run No. | KCN insoluble content wt % | Open pores on the surface of particles, No. per 100 $\mu m^2$ | Crevices | Springback % | Cell capacity, mAh |
|---|---|---|---|---|---|---|
| Example | a | 0.1 | 8 | present | 0.5 | 88 |
|  | b | 0.1 | 7 | present | 0.9 | 91 |
|  | c | 0.2 | 5 | present | 0.7 | 89 |
|  | d | 0.2 | 9 | present | 0.7 | 89 |
|  | e | 0.3 | 5 | present | 0.7 | 83 |
|  | f | 0.2 | 5 | present | 0.8 | 82 |
|  | g | 0.1 | 8 | present | 0.8 | 81 |
|  | h | 0.3 | 12 | present | 0.8 | 84 |
|  | i | 0.1 | 16 | present | 0.9 | 86 |
|  | j | 0.1 | 15 | present | 0.7 | 83 |
|  | k | 0.1 | 10 | present | 0.8 | 87 |

TABLE 1

Conditions for Preparation of Silver Oxide Powders

|  | Run No. | Ag concentration, g/L | Reactant Name | Amount, eq. | pH adjusting agent | Bulk density, g/cm³ | Fluidity, cm | Particle size distribution, % of ≦5 $\mu m$ | Particle strength, wt %/min | C content, wt % | Cl content, wt % |
|---|---|---|---|---|---|---|---|---|---|---|---|
| Example | a | 50 | sodium carbonate | 1 | nitric acid + aq. ammonia | 2.07 | 10.2 | 0.2 | 0.3 | 0.02 | <0.005 |
|  | b | 100 | sodium carbonate | 1 | nitric acid + aq. ammonia | 2.05 | 11.4 | 0.1 | 0.5 | 0.02 | <0.005 |
|  | c | 200 | sodium carbonate | 1 | nitric acid + aq. ammonia | 2.11 | 10.9 | 0.1 | 0.4 | 0.03 | <0.005 |
|  | d | 100 | sodium carbonate | 2 | nitric acid + aq. ammonia | 2.18 | 12.8 | 0.2 | 0.4 | 0.02 | <0.005 |
|  | e | 100 | sodium citrate + sodium carbonate | 1 + 1 | nitric acid + aq. ammonia | 1.83 | 9.7 | 0.2 | 0.8 | 0.04 | <0.005 |
|  | f | 100 | sodium potassium tartrate + sodium carbonate | 1 + 1 | nitric acid + aq. ammonia | 1.93 | 10.1 | 0.3 | 0.7 | 0.06 | <0.005 |
|  | g | 100 | sodium hydrogen-carbonate | 1 | nitric acid + aq. ammonia | 2.00 | 9.8 | 0.1 | 0.5 | 0.02 | <0.005 |
|  | h | 100 | ammonium carbonate | 1 | nitric acid + aq. ammonia | 1.95 | 9.9 | 0.2 | 0.6 | 0.02 | <0.005 |
|  | i | 100 | ammonium hydrogen-carbonate | 1 | nitric acid + aq. ammonia | 2.01 | 10.9 | 0.5 | 0.7 | 0.05 | <0.005 |
|  | j | 100 | potassium carbonate | 1 | nitric acid + aq. ammonia | 1.91 | 8.9 | 0.1 | 0.6 | 0.02 | <0.005 |
|  | k | 100 | potassium hydrogen-carbonate | 1 | nitric acid + aq. ammonia | 1.86 | 10.4 | 0.1 | 0.8 | 0.02 | <0.005 |
|  | l | 100 | carbon dioxide | 1 | nitric acid + aq. ammonia | 1.91 | 9.1 | 0.3 | 0.5 | 0.02 | <0.005 |
| Comparative Example | m | 100 | sodium hydroxide | 1 | nitric acid + aq. ammonia | 0.92 | 3.2 | 5.99 | 35.0 | 0.02 | <0.005 |
|  | n | 100 | potassium hydroxide | 1 | nitric acid + aq. ammonia | 0.88 | 3.9 | 6.2 | 38.3 | 0.03 | <0.005 |
|  | o | 100 | ammonium hydroxide | 1 | nitric acid + aq. ammonia | 0.80 | 3.3 | 12.3 | 45.2 | 0.07 | <0.005 |

TABLE 2-continued

Characteristic Values of Silver Oxide Powders

| | Run No. | KCN insoluble content wt % | Open pores on the surface of particles, No. per 100 $\mu m^2$ | Crevices | Spring-back % | Cell capacity, mAh |
|---|---|---|---|---|---|---|
| | l | 0.1 | 6 | present | 0.9 | 84 |
| Comparative | m | 0.2 | 0 | absent | 1.1 (cracked) | 72 |
| Example | n | 0.2 | 0 | absent | 1.2 | 71 |
| | o | 0.3 | 0 | absent | 1.4 | 68 |

Comparative Example (m) An aqueous sodium hydroxide solution was added to an aqueous silver nitrate solution (100 g/L of Ag) in an equivalent amount (molar ratio of sodium hydroxide to Ag=0.5) under stirring. The pH of the mixture was adjusted to 6–8 by addition of nitric acid and an aqueous sodium hydroxide solution to generate a silver oxide precipitate. The precipitate was washed, filtered and dried at 100° C.; thereafter, the temperature was slowly raised to a maximum of 250° C., at which the precipitate was dried to yield a silver oxide powder.

(n) and (o) Additional silver oxide powder samples were prepared by repeating the procedure of (m) except that the aqueous sodium hydroxide solution was replaced by other reactants.

The silver oxide powder samples thus prepared were subjected to X-ray diffraction but substantially no silver peak occurred in any sample. The comparative samples were also evaluated for their characteristics as in the Example.

The conditions for preparing the comparative samples and the results of evaluation of their characteristics are also shown in Tables 1 and 2, respectively.

The silver oxide prepared by the process of the present invention has substantially decreased contents of the residual carbon and chlorine, which could cause deterioration of cell capacity, bursting of cells or the like. The comparative Example shows that the cell prepared by using conventional silver oxide was 68–72 mAh, while the Example shows that the cell of the present invention exhibited the capacity of 81–91 mAh, and the cell was free from explosion. Thus, it is obvious that cells prepared by using the silver oxide of the present invention are superior to the prior art cells.

Instead of the sample cell used in the working and comparative examples, a commercial product size cell comparable to SR54 of I.E.C. standard (nominal capacity 80 mAh) was prepared by using silver oxide powder samples of (n) used in comparative Example and samples (b) and (g) used in Working Example. Cell characteristic were determined in the the same manner as in comparative and working examples. The results are as shown below.

| | capacity |
|---|---|
| sample n (Comparative Example) | 75 mAh |
| sample b (Example) | 96 mAh |
| sample g (Example) | 87 mAh |

As is obvious from the test results shown above, cells prepared by using the silver oxide of the present invention were superior in the cell characteristic than the cell prepared by using the prior art silver oxide.

The sticking of powders to the mold during pressure forming was prevented by excluding fines; any adverse effects of the binder on the cell characteristic were eliminated by granulating particles in the absence of a binder; the absorption of the electrolyte into the shaped pellets was facilitated by providing open pores in the primary particles: the fluidity angle was so adjusted as to facilitate molding; and the bulk density of the granules was so adjusted as to increase the density of the pellets. Thus, silver oxide powders satisfying all performance requirements for use in cells could be produced in accordance with the invention.

What is claimed is:

1. A process for producing silver oxide which comprises silver oxide granules and which, when subjected to a measurement of the strength of particles with a ro-tap automatic sifter fitted with a 200-mesh standard sieve, yields −200 mesh particles in an amount of no more than 1 wt % per minute due to particle disintegration, the process comprising adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the resultant mixture to between 4 and 9 to yield an organic acid salt or a carbonate of silver.

2. A process for producing silver oxide which comprises silver oxide granules which comprise spherical porous particles having crevices on the surface thereof which are 1 to 30 $\mu m$ wide and not longer than 300 $\mu m$, the process comprising adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the mixture to between 4 and 9 to precipitate and grow an organic acid salt or a carbonate of silver, wherein dissolution and crystallization which occur in the steps of the precipitation and growth of the organic acid salt or carbonate and a subsequent granulation are repeated to thereby form crevices on the surfaces of granules.

3. A process for producing silver oxide which comprises silver oxide granules having 5 to 20 open pores on the surface thereof per 100 $\mu m^2$ of the surface thereof in diameters of 0.1 to 5 $\mu m$, the process comprising adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the resultant mixture to between 4 and 9 to precipitate an organic acid salt or a carbonate of silver, wherein the precipitate is dried at an insufficient temperature to cause substantial reduction of silver, whereby the carbonate or organic acid salt is decomposed to yield silver oxide.

4. A process for producing silver oxide which comprises silver oxide granules having a maximum size of no more than 300 µm, and the content of fines no greater than 5 µm being no more than 5 wt %, the process comprising adding at least one of sodium citrate, sodium potassium tartrate, sodium carbonate, sodium hydrogencarbonate, ammonium carbonate, ammonium hydrogencarbonate, potassium carbonate, potassium hydrogencarbonate and carbon dioxide to an aqueous silver nitrate solution in an amount of 1–2 equivalents per silver and adjusting the pH of the mixture to between 4 and 9 to precipitate an organic acid salt or a carbonate of silver, wherein the precipitate is dried at an insufficient temperature to cause substantial reduction of silver, whereby the carbonate or organic acid salt is decomposed to yield silver oxide which is subsequently sieved.

5. In a galvanic cell, the improvement comprising the galvanic cell containing the silver oxide produced by the process of claim 1.

6. In a galvanic cell, the improvement comprising the galvanic cell containing the silver oxide produced by the process of claim 2.

7. In a galvanic cell, the improvement comprising the galvanic cell containing the silver oxide produced by the process of claim 3.

8. In a galvanic cell, the improvement comprising the galvanic cell containing the silver oxide produced by the process of claim 4.

* * * * *